(12) United States Patent
Ji et al.

(10) Patent No.: US 8,965,073 B2
(45) Date of Patent: Feb. 24, 2015

(54) DATA INPUT METHOD AND ULTRASONIC IMAGING APPARATUS

(75) Inventors: Kai Ji, Wuxi (CN); Wei Yu, Wuxi (CN); Changsheng Xie, Wuxi (CN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 1194 days.

(21) Appl. No.: 12/487,357

(22) Filed: Jun. 18, 2009

(65) Prior Publication Data

US 2009/0316974 A1 Dec. 24, 2009

(30) Foreign Application Priority Data

Jun. 20, 2008 (CN) .......................... 2008 1 0131451

(51) Int. Cl.
*G06K 9/00* (2006.01)
*G01S 7/52* (2006.01)

(52) U.S. Cl.
CPC .......... *G01S 7/52017* (2013.01); *G01S 7/52082* (2013.01)
USPC ............................ 382/128; 600/447; 600/439

(58) Field of Classification Search
None
See application file for complete search history.

(56) References Cited

U.S. PATENT DOCUMENTS

| | | | |
|---|---|---|---|
| 4,893,286 A * | 1/1990 | Cobb ............................. | 367/87 |
| 5,453,575 A * | 9/1995 | O'Donnell et al. ............ | 600/463 |
| 5,483,963 A | 1/1996 | Butler et al. | |
| 5,628,321 A | 5/1997 | Scheib et al. | |
| 5,709,209 A | 1/1998 | Friemel et al. | |
| 5,722,412 A | 3/1998 | Pflugrath et al. | |
| 5,781,515 A | 7/1998 | Ogata et al. | |
| 5,782,769 A | 7/1998 | Hwang et al. | |
| 5,926,187 A * | 7/1999 | Kim .............................. | 345/629 |
| 6,203,498 B1 | 3/2001 | Bunce et al. | |
| 6,379,304 B1 * | 4/2002 | Gilbert et al. ................. | 600/447 |
| 6,547,730 B1 | 4/2003 | Lin et al. | |
| 6,607,489 B2 * | 8/2003 | Hoctor et al. ................. | 600/443 |
| 6,608,630 B1 * | 8/2003 | MacInnis et al. ............. | 345/634 |
| 6,669,634 B2 * | 12/2003 | Amemiya ...................... | 600/437 |
| 6,926,369 B2 * | 8/2005 | McCaster et al. ............ | 301/37.25 |
| 7,681,012 B2 * | 3/2010 | Verma et al. .................. | 711/207 |
| 8,009,904 B2 * | 8/2011 | Willsie .......................... | 382/167 |
| 8,221,324 B2 * | 7/2012 | Pedersen et al. .............. | 600/459 |
| 8,475,375 B2 * | 7/2013 | Smith et al. ................... | 600/437 |
| 2001/0044278 A1 * | 11/2001 | Chiao et al. .................. | 455/67.1 |
| 2003/0028113 A1 * | 2/2003 | Gilbert et al. ................. | 600/447 |

(Continued)

FOREIGN PATENT DOCUMENTS

| | | |
|---|---|---|
| CN | 1313596 A | 9/2001 |
| JP | 2002-200079 | 7/2002 |

(Continued)

OTHER PUBLICATIONS

Unofficial translation of Ota et al., "2nd base of mobile communications technology", Interface, Volume No. 24, Issue No. 7, pp. 207-212, Jul. 1, 1998.

(Continued)

*Primary Examiner* — Nancy Bitar
(74) *Attorney, Agent, or Firm* — Armstrong Teasdale LLP

(57) ABSTRACT

An ultrasonic imaging apparatus for processing ultrasonic raw data by a processor, includes a processor having a video processing front end, and a data input device for inputting the ultrasonic raw data to the video processing front end of the processor.

14 Claims, 3 Drawing Sheets

(56) References Cited

U.S. PATENT DOCUMENTS

| | | | |
|---|---|---|---|
| 2005/0137479 A1* | 6/2005 | Haider | 600/440 |
| 2005/0186933 A1* | 8/2005 | Trans | 455/296 |
| 2005/0228281 A1* | 10/2005 | Nefos | 600/446 |
| 2006/0173319 A1* | 8/2006 | Sumi | 600/437 |
| 2006/0261707 A1* | 11/2006 | Wildes et al. | 310/346 |
| 2008/0108899 A1* | 5/2008 | Halmann et al. | 600/459 |
| 2010/0286518 A1* | 11/2010 | Lee et al. | 600/439 |
| 2010/0286519 A1* | 11/2010 | Lee et al. | 600/439 |

FOREIGN PATENT DOCUMENTS

| | | | |
|---|---|---|---|
| JP | 2004065370 A | | 3/2004 |
| JP | 2004-344516 | | 12/2004 |
| JP | 2004351083 A | | 12/2004 |
| JP | 2005117494 A | | 7/2005 |
| JP | 2007244580 | * | 9/2007 |
| JP | 2007244580 A | | 9/2007 |

OTHER PUBLICATIONS

Unofficial translation of Kasuya, "Automotive electronics and EMC", Volume No. 44, Issue No. 10, pp. 47-53, Oct. 1, 1999.

Unofficial translation of Kagami et al., "Development of massively parallel vision chip", Volume No. 46, Issue No. 3, pp. 6-9, Mar. 1, 2001.

Unofficial translation of Japanese Office Action from JP Application No. 2009-132198, dated Nov. 19, 2013.

Unofficial translation of Chinese Office Action from CN Application No. 200810131451.3, dated Mar. 7, 2013.

Unofficial translation of Japanese Office Action from JP Application No. 2009-132198, dated Jun. 7, 2013.

Unofficial translation of Japanese Notice of Allowance for corresponding JP Application No. 2009-132198 dated Apr. 8, 2014.

* cited by examiner

DATA INPUT METHOD AND ULTRASONIC IMAGING APPARATUS

CROSS REFERENCE TO RELATED APPLICATIONS

This application claims the benefit of Chinese Patent Application No. 200810131451.3 filed Jun. 20, 2008, which is hereby incorporated by reference in its entirety.

BACKGROUND OF THE INVENTION

The embodiments described herein relate to a data input method and an ultrasonic imaging apparatus, and more particularly to a method of inputting ultrasonic raw data to a processor, as well as an ultrasonic imaging apparatus for processing the ultrasonic raw data by the processor.

An example of the ultrasonic imaging apparatus is a portable ultrasonic imaging system that is similar to a note-type personal computer. This type of ultrasonic imaging apparatus can be carried by a doctor in the ward round or home visit, and is highly convenient (see, for example, Japanese Unexamined Patent Publication No. 2002-200079).

In the ultrasonic imaging apparatus, when ultrasonic raw data is inputted to a processor, high throughput is necessary to enable real time imaging. For this reason, high-speed data transfer systems such as DMA (Direct Memory Access) and PCI (Peripheral Component Interconnect) are used (see, for example, Japanese Unexamined Patent Publication No. 2004-344516).

In the portable ultrasonic imaging apparatus, it is very difficult to be equipped with high-speed data transfer systems such as DMA and PCI, due to limitations in the internal space, power consumption, or cost.

BRIEF DESCRIPTION OF THE INVENTION

A first aspect of the invention is a data input method for inputting ultrasonic raw data to a video processing front end of a processor.

A second aspect of the invention is the data input method according to the first aspect, wherein the ultrasonic raw data is inputted as vector data.

A third aspect of the invention is the data input method according to the second aspect, wherein the vector data is formed by packing the ultrasonic raw data.

A fourth aspect of the invention is the data input method according to the third aspect, wherein the ultrasonic raw data is packed for each PRT.

A fifth aspect of the invention is the data input method according to the second aspect, wherein the vector data is inputted together with a synchronization signal.

A sixth aspect of the invention is the data input method according to the fifth aspect, wherein the synchronization signal is inputted for each vector data.

A seventh aspect of the invention is the data input method according to the sixth aspect, wherein the synchronization signal includes a vertical synchronization signal and a horizontal synchronization signal.

An eighth aspect of the invention is the data input method according to the second aspect, wherein the vector data is inputted together with a write enable signal.

A ninth aspect of the invention is the data input method according to the eighth aspect, wherein the write enable signal is inputted for each vector data.

A tenth aspect of the invention is the data input method according to the first aspect, wherein the data size of the ultrasonic raw data is variable.

An eleventh aspect of the invention is an ultrasonic imaging apparatus for processing ultrasonic raw data by a processor, wherein the processor has a video processing front end as well as a data input device for inputting ultrasonic raw data to the video processing front end of the processor.

A twelfth aspect of the invention is the ultrasonic imaging apparatus according to the eleventh aspect, wherein the ultrasonic raw data is inputted as vector data.

A thirteenth aspect of the invention is the ultrasonic imaging apparatus according to the twelfth aspect, wherein the vector data is formed by packing the ultrasonic raw data.

A fourteenth aspect of the invention is the ultrasonic imaging apparatus according to the thirteenth aspect, wherein the ultrasonic raw data is packed for each PRT.

A fifteenth aspect of the invention is the ultrasonic imaging apparatus according to the twelfth aspect, wherein the vector data is inputted together with a synchronization signal.

A sixteenth aspect of the invention is the ultrasonic imaging apparatus according to the fifteenth aspect, wherein the synchronization signal is inputted for each vector data.

A seventeenth aspect of the invention is the ultrasonic imaging apparatus according to the sixteenth aspect, wherein the synchronization signal includes a vertical synchronization signal and a horizontal synchronization signal.

An eighteenth aspect of the invention is the ultrasonic imaging apparatus according to the twelfth aspect, wherein the vector data is inputted together with a write enable signal.

A nineteenth aspect of the invention is the ultrasonic imaging apparatus according to the eighteenth aspect, wherein the write enable signal is inputted for each vector data.

A twentieth aspect of the invention is the ultrasonic imaging apparatus according to the eleventh aspect, wherein the data size of the ultrasonic raw data is variable.

According to the first aspect of the invention, upon input of the ultrasonic raw data to the processor, the ultrasonic raw data is inputted to the video processing front end of the processor. Thus, it is possible to realize a data input method in which the ultrasonic raw data is inputted at high speed independent of high-speed data transmission systems.

According to the eleventh aspect of the invention, the ultrasonic imaging apparatus for processing the ultrasonic raw data by the processor, includes the processor having the video processing front end, and the data input device for inputting the ultrasonic raw data to the video processing front end of the processor. Thus, it is possible to realize an ultrasonic imaging apparatus in which the ultrasonic raw data is inputted at high speed independent of high-speed data transmission systems.

According to the second or twelfth aspect of the invention, the ultrasonic raw data is inputted as vector data. Thus, it is possible to increase the efficiency of the data input.

According to the third or thirteenth aspect of the invention, the vector data is formed by packing the ultrasonic raw data. Thus, it is possible to optimize the structure of the vector data.

According to the fourth or fourteenth aspect of the invention, the ultrasonic raw data is packed for each PRT. Thus, it is possible to optimize the packing of the ultrasonic raw data.

According to the fifth or fifteenth aspect of the invention, the vector data is inputted together with a synchronization signal. Thus, it is possible to optimize the data input.

According to the sixth or sixteenth aspect of the invention, the synchronization signal is inputted for each vector data. Thus, it is possible to facilitate the data input in a synchronous manner.

According to the seventh or seventeenth aspect of the invention, the synchronization signal includes a vertical synchronization signal and a horizontal synchronization signal. Thus, it is possible to ensure the data input in a synchronous manner.

According to the eighth or eighteenth aspect of the invention, the vector data is inputted together with a write enable signal. Thus, it is possible to optimize the data input.

According to the ninth or nineteenth aspect of the invention, the write enable signal is inputted for each vector data. Thus, it is possible to ensure the data input.

According to the tenth or twentieth aspect of the invention, the data size of the ultrasonic raw data is variable. Thus, it is possible to apply to various ultrasonic imaging modes.

Further objects and advantages of the present invention will be apparent from the following description of the preferred embodiments of the invention as illustrated in the accompanying drawings.

DETAILED DESCRIPTION OF THE INVENTION

Hereinafter, various embodiments of the invention will be described in detail with reference to the accompanying drawings. It is to be understood that the invention is not limited to the embodiments described herein.

Figure 1:
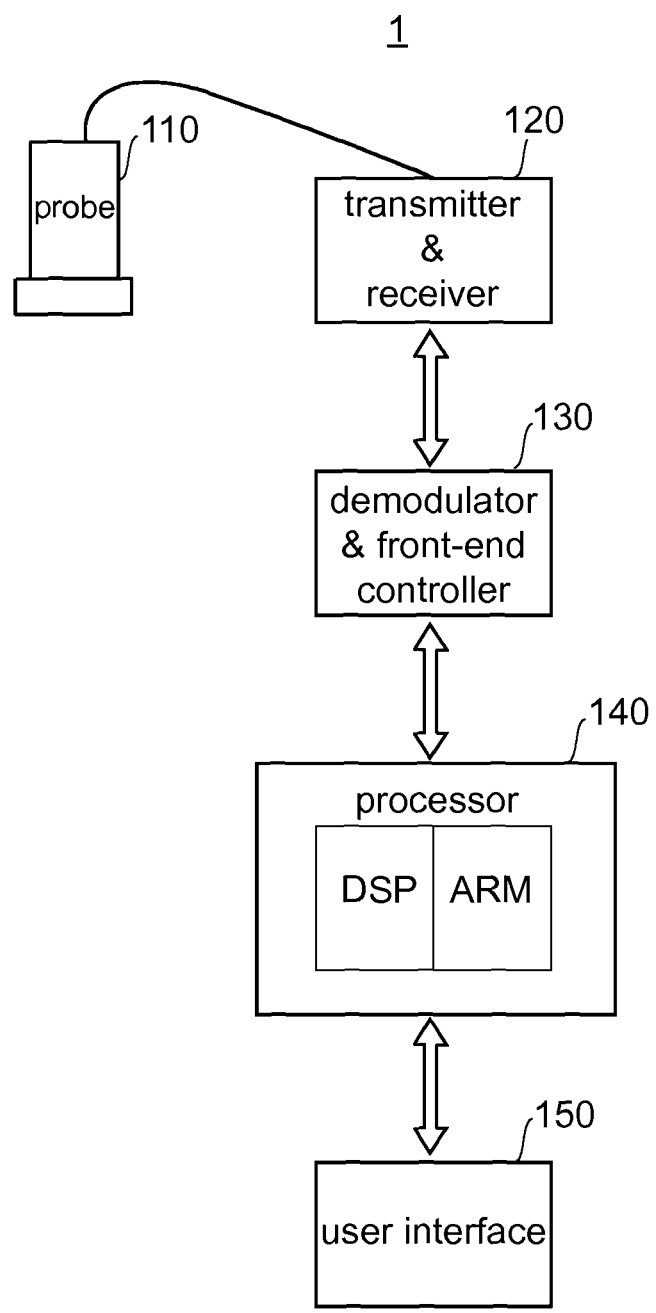
FIG. 1 is a block diagram of an exemplary ultrasonic imaging apparatus.

FIG. 1 shows a block diagram of an exemplary ultrasonic imaging apparatus 1. There is shown an exemplary data input method, that may be used during operation of the ultrasonic imaging apparatus 1. There is shown an exemplary configuration of the ultrasonic imaging apparatus 1.

As shown in FIG. 1, the ultrasonic imaging apparatus 1 has a probe 110. The probe 110 is connected to a transmitter & receiver 120. The transmitter & receiver 120 transmits ultrasonic waves by driving the probe 110, and receives echo signals through the probe 110.

The transmitter & receiver 120 periodically repeats the transmission and reception of ultrasonic waves under the control of a demodulator & front-end controller 130, and scans imaging ranges by sequentially switching between the transmission and reception directions. Hereinafter the period of repetition of the ultrasonic transmission and reception is referred to as PRT (Pulse Repetition Time).

The demodulator & front-end controller 130 generates ultrasonic raw data by demodulating an echo reception signal of the transmitter & receiver 120. Hereinafter the ultrasonic raw data is also simply referred to as raw data.

The demodulator & front-end controller 130, for example, includes semiconductor integrated circuits such as FPGA (Field Programmable Gate Array) and ASIC (Application Specific Integrated Circuit).

The raw data is inputted from the demodulator & front-end controller 130 to a processor 140. The processor 140 performs various data processings for ultrasonic imaging with respect to the raw data, to reconstruct a predetermined image or sound, for example, such as B-mode image, CFM (Color Flow Mapping) image, Doppler image, or Doppler sound.

As the processor 140, for example, a system LSI (System Large Scale Integrated Circuit) having a DSP core (Digital Signal Processor core) and an ARM core (Advanced RISC Machine core) is used. This kind of system LSI is commercially available as SoC (System on a Chip). The processor 140 is an example of the processor according to the invention.

The image and sound reconstructed by the processor 140 are presented to a user through a user interface 150. The user interface 150 displays the image by a graphic display and the like, and provides the sound by a speaker and the like.

Figure 2:
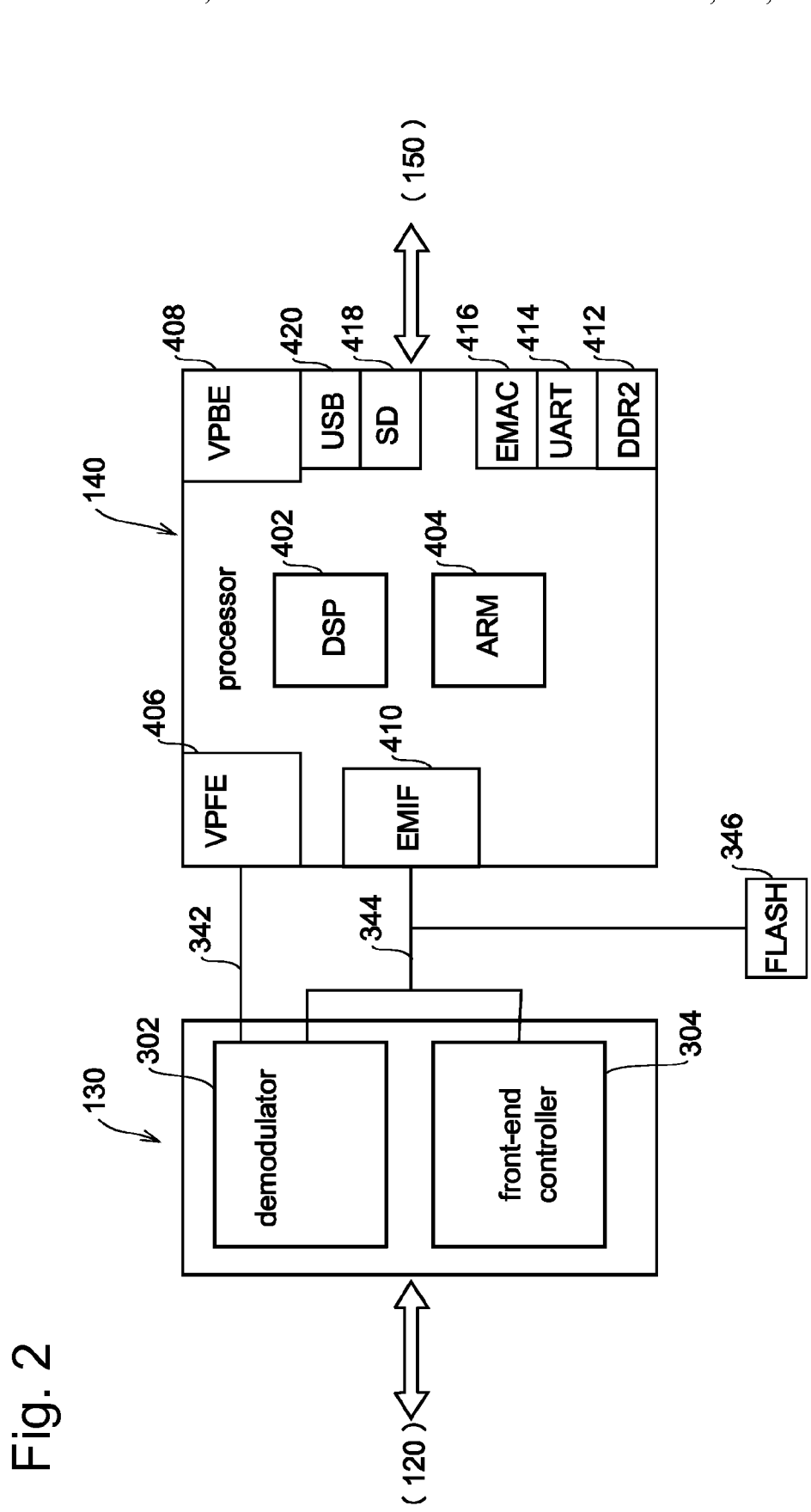
FIG. 2 is a block diagram showing a detailed configuration of a demodulator & front-end controller and a processor.

FIG. 2 shows a detailed configuration of the demodulator & front-end controller 130 and the processor 140. As shown in FIG. 2, the demodulator & front-end controller 130 has a demodulator 302 and a front-end controller 304.

The processor 140 has a DSP core 402 and an ARM core 404 to serve as a core of the data processing. The processor 140 also has a video processing front end (VPFE) 406 as a front end, as well as a video processing back end (VPBE) 408 as a back end.

Further, the processor 140 has peripherals including an external memory interface (EMIF) 410, DDR2 (Double Data Rate 2) interface 412, UART (Universal Asynchronous Receiver Transmitter) interface 414, EMAC (Ethernet MAC) interface 416, SD (SD Memory Card) interface 418, and USB (Universal Serial Bus) interface 420.

The video processing front end 406 has a video port to which the demodulator 302 is connected through a video bus 342. The raw data generated by the demodulator 302 is inputted to the video port of the video processing front end 406 through the video bus 342. The demodulator 302 is an example of the data input device according to the invention.

The demodulator 302, the front-end controller 304, and a flash memory (FLASH) 346 are connected to the external memory interface 410 by an external memory interface bus 344.

Figure 3:
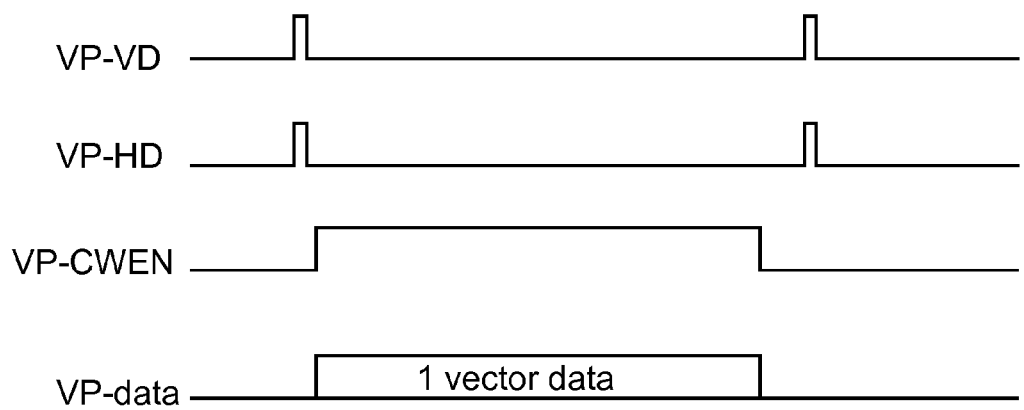
FIG. 3 is a time chart for data input.

FIG. 3 shows a time chart. As shown in FIG. 3, one vector data VP-data (Video Port data) is inputted together with a vertical synchronization signal VP-VD (Video Port Vertical synchronization), a horizontal synchronization signal VP-HD (Video Port Horizontal synchronization), and a write enable signal VP-CWEN (Video Port CCD Controller Write Enable).

The vertical synchronization signal VP-VD, the horizontal synchronization signal VP-HD, and the write enable signal VP-CWEN are the synchronization signals and write control signal for a CCD controller (Charge Coupled Device controller) within the video processing front end 406.

One vector data VP-data is formed by packing the raw data. The raw data is packed for each PRT. In other words, the raw data for each PRT is packed to form one vector data. The packing of the raw data is performed in the demodulator 302.

As described above, the input of the raw data formed as the vector data allows for a high-speed data input using the high speed capability of the video processing font end 406. Thus, it is possible to input data at high speed without using high-speed data transmission systems such as DMA and PCI.

Further, the video port of the video processing front end 406 can be applied to various data sizes. This allows for a high-speed data input, regardless of the size of the raw data that is different among the ultrasonic imaging modes, for example, such as B mode, CFM mode, and Doppler mode.

Many widely different embodiments of the invention may be configured without departing from the spirit and the scope of the present invention. It should be understood that the present invention is not limited to the specific embodiments described in the specification, except as defined in the appended claims.

What is claimed is:

1. A data input method for inputting ultrasonic raw data to a processor, said method comprising:

forming, using a demodulator, vector data by packing the ultrasonic raw data in the demodulator for each period of repetition of ultrasonic transmission and reception; and
inputting the vector data from the demodulator directly to a video processing front end of the processor, wherein the demodulator is coupled to the video processing front end through a video bus and coupled to an external memory interface of the processor through an external memory interface bus.

2. The data input method according to claim 1, further comprising inputting a synchronization signal with the vector data.

3. The data input method according to claim 2, wherein inputting a synchronization signal comprises inputting a synchronization signal for each vector data.

4. The data input method according to claim 3, wherein inputting a synchronization signal comprises inputting a vertical synchronization signal and inputting a horizontal synchronization signal.

5. The data input method according to claim 1, further comprising inputting a write enable signal with the vector data.

6. The data input method according to claim 5, wherein inputting a write enable signal comprises inputting a write enable signal for each vector data.

7. The data input method according to claim 1, wherein a data size of the ultrasonic raw data is variable.

8. An ultrasonic imaging apparatus for processing ultrasonic raw data by a processor, said ultrasonic imaging apparatus comprising:

a processor comprising a video processing front end and an external memory interface; and
a data input device configured to input the ultrasonic raw data directly to the video processing front end of the processor as vector data, wherein the data input device is a demodulator further configured to form the vector data by packing the ultrasonic raw data in the demodulator for each period of repetition of ultrasonic transmission and reception, and wherein the demodulator is coupled to the video processing front end through a video bus and coupled to the external memory interface through an external memory interface bus.

9. The ultrasonic imaging apparatus according to claim 8, wherein the vector data is inputted together with a synchronization signal.

10. The ultrasonic imaging apparatus according to claim 9, wherein the synchronization signal is inputted for each vector data.

11. The ultrasonic imaging apparatus according to claim 10, wherein the synchronization signal includes a vertical synchronization signal and a horizontal synchronization signal.

12. The ultrasonic imaging apparatus according to claim 8, wherein the vector data is inputted together with a write enable signal.

13. The ultrasonic imaging apparatus according to claim 12, wherein the write enable signal is inputted for each vector data.

14. The ultrasonic imaging apparatus according to claim 8, wherein the data size of the ultrasonic raw data is variable.

\* \* \* \* \*